US008471560B2

(12) United States Patent
Freedman et al.

(10) Patent No.: US 8,471,560 B2
(45) Date of Patent: Jun. 25, 2013

(54) MEASUREMENTS IN NON-INVADED FORMATIONS

(75) Inventors: Robert Freedman, Houston, TX (US); Douglas W. Grant, Austin, TX (US); Henry N. Bachman, Missouri City, TX (US); Pierre Campanac, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 687 days.

(21) Appl. No.: 12/562,409

(22) Filed: Sep. 18, 2009

(65) Prior Publication Data

US 2011/0068787 A1    Mar. 24, 2011

(51) Int. Cl.
*G01V 3/00*    (2006.01)
(52) U.S. Cl.
USPC .......................................... 324/303; 175/40
(58) Field of Classification Search
USPC ................ 324/303, 318, 322; 175/40, 50, 81
See application file for complete search history.

(56) References Cited

U.S. PATENT DOCUMENTS

| | | | |
|---|---|---|---|
| 4,714,119 A | 12/1987 | Hebert et al. | |
| 6,028,534 A | 2/2000 | Ciglenec et al. | |
| 6,070,662 A | 6/2000 | Ciglenec et al. | |
| 6,528,995 B1 | 3/2003 | Speier et al. | |
| 6,856,132 B2 | 2/2005 | Appel et al. | |
| 6,896,074 B2 | 5/2005 | Cook et al. | |
| 7,032,691 B2 | 4/2006 | Humphreys | |
| 7,191,831 B2 | 3/2007 | Reid et al. | |
| 7,308,952 B2 | 12/2007 | Strazhgorodskiy | |
| 7,347,262 B2 | 3/2008 | Tarvin et al. | |
| 7,673,704 B2 | 3/2010 | Phan et al. | |
| 8,011,453 B2 * | 9/2011 | Lavrut et al. | 175/81 |
| 2006/0000606 A1 | 1/2006 | Fields et al. | |
| 2006/0054358 A1 | 3/2006 | Hill et al. | |
| 2007/0137894 A1 * | 6/2007 | Fujisawa et al. | 175/20 |
| 2009/0025941 A1 | 1/2009 | Iskander et al. | |
| 2009/0114447 A1 | 5/2009 | Reid, Jr. et al. | |
| 2011/0174543 A1 * | 7/2011 | Walkingshaw et al. | 175/58 |
| 2011/0198078 A1 * | 8/2011 | Harrigan et al. | 166/254.2 |

* cited by examiner

*Primary Examiner* — Louis Arana
(74) *Attorney, Agent, or Firm* — Kenneth Liu; Darla P. Fonseca

(57) ABSTRACT

The present invention relates to making one or more measurements in a virgin formation using a downhole tool that includes a miniature logging tool. The downhole tool is disposed in a wellbore penetrating the formation, adjacent to the formation, and a sidetrack borehole is made into the formation. All or a portion of the miniature logging tool is deployed into the sidetrack borehole and measurements are made in the virgin formation using the miniature logging tool. The downhole tool may include a drilling/coring module, a pump module, and packers. The drilling/coring module is used to make the sidetrack borehole, and the packers and pump module can be used to create an underbalanced drilling condition in an isolated section of the wellbore.

24 Claims, 12 Drawing Sheets

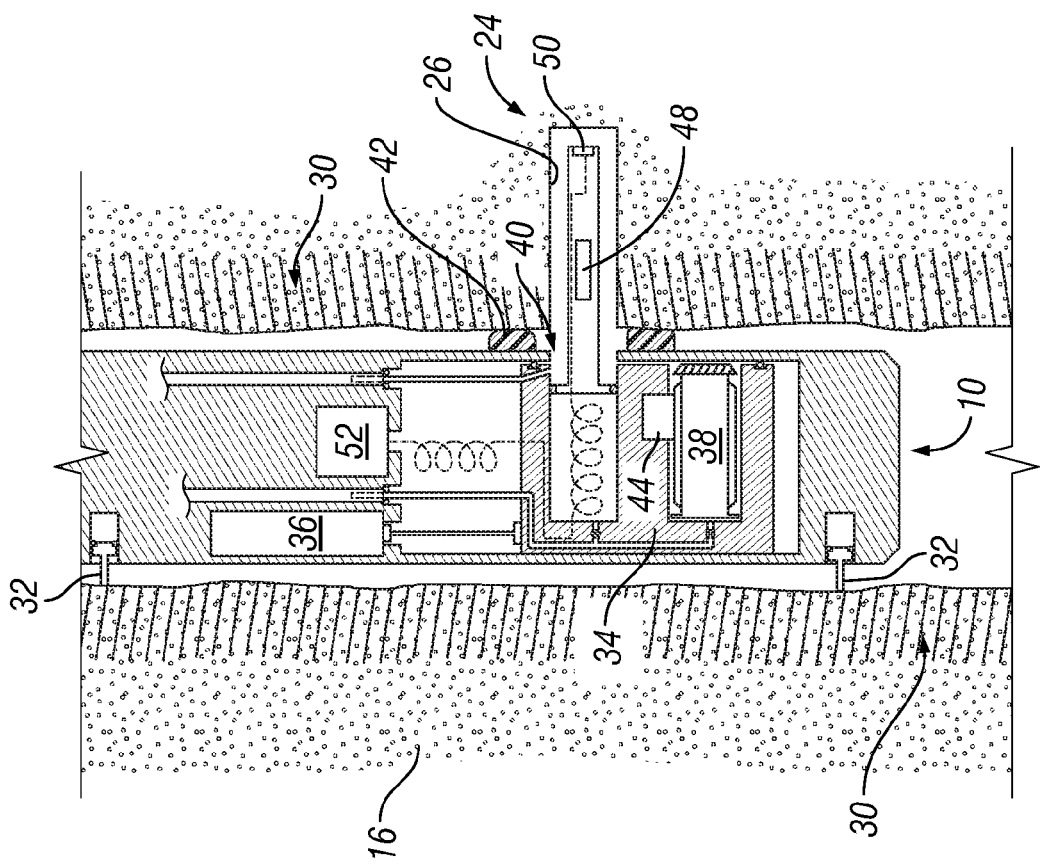
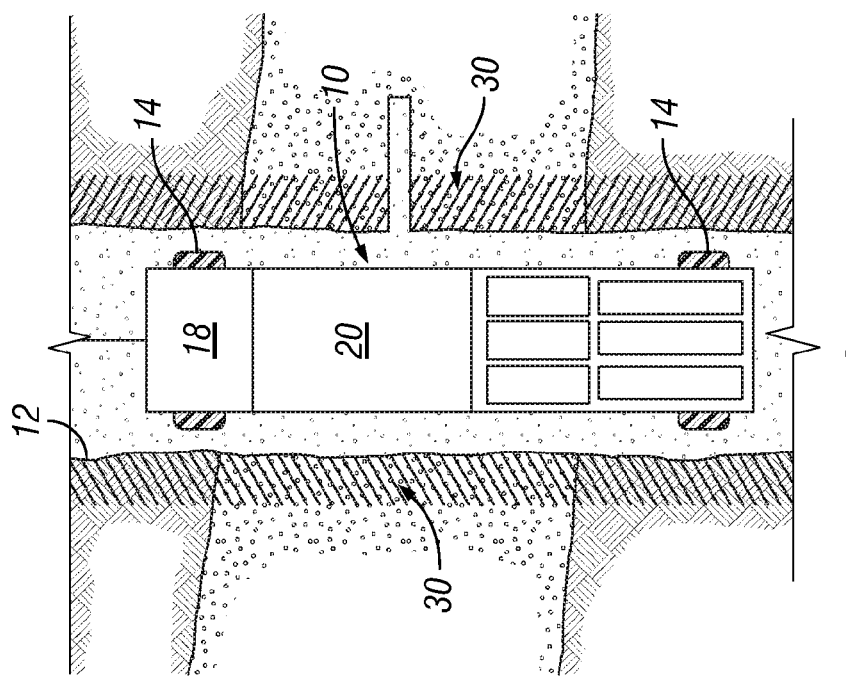

MEASUREMENTS IN NON-INVADED FORMATIONS

CROSS-REFERENCE TO OTHER APPLICATIONS

Not applicable

BACKGROUND OF INVENTION

1. Field of the Invention

The present application relates generally to the field of logging tools, and particularly to using logging tools to make measurements in virgin formations.

2. Background

Logging tools have long been used to make subsurface measurements. Most of the measurements made by commercial borehole logging tools have depths of investigation (DOI) of a few inches or less. A widely used metric for DOI for many borehole logging devices is the radial distance from the borehole wall from which 50% of the measured signal is received. The DOI is defined differently, however, for nuclear magnetic resonance (NMR) tools such as Schlumberger's MR Scanner™ tool. For those tool-types, all of the signal is derived from thin radial shells that are located different distances (e.g., 1, 2, 3, 4 in.) from the borehole wall.

Wellbores are usually drilled in an over-balanced condition. That is, the hydraulic pressure in the wellbore is maintained above the formation pore pressure. The near wellbore region is often contaminated by drilling fluid and damaged by fines invasion that occurs during the drilling process. Also, the combined action of drilling and particle filtration in the near wellbore region may result in a damaged zone having a permeability that is not representative of the rest of the formation. The region of the formation invaded by drilling fluids is called the invaded or flushed zone. There is also a particle filtrate layer, called "mudcake", that forms during the drilling fluid invasion process that can adversely affect logging tool responses of pad-type devices.

Borehole logging measurements include those made by NMR, borehole imaging, resistivity, microwave dielectric, acoustic, nuclear, pressure, and fluid sampling tools. With the exception of electrical resistivity (e.g., deep laterolog tools) and conductivity (e.g., deep induction tools), borehole logging measurements are confined to the flushed zone; that is, within a few inches of the borehole wall. Fundamental physics and instrument limitations preclude most borehole logging measurements from penetrating deep enough into the formation to extend beyond the flushed zone. Measurements having a shallow DOI (e.g., less than 4 inches), such as NMR measurements, measure formation properties of the invaded/damaged zone that are not necessarily representative of the formation beyond the invaded/damaged zone.

The use of Pulsed NMR well logging measurements to evaluate oil and gas reservoirs began in the early 1990s. Since that time the technologies and interpretation methods have evolved to a high level of sophistication and today's tools can provide a host of reservoir fluid and rock properties. These include lithology independent total porosity, free and bound fluid water volumes, fluid types and saturations, and estimates of oil viscosity and reservoir permeability. NMR measurements can be made at different depths of investigation by changing the tool frequency; however, the DOI are generally limited to no more than a few inches beyond the borehole wall. The technology required to make NMR measurements at different depths is very complex.

As stated, Pulsed NMR well logging measurements have shallow depths of investigation and therefore only measure the flushed zone of the reservoir within a few inches of the borehole wall. Deep borehole NMR measurements do not seem possible because of the short range nature of static magnetic fields and the low signal to noise ratio of deep reading NMR measurements. It would be a significant advance in formation evaluation if shallow reading borehole measurements could be made in a non-invaded formation, i.e., beyond the depth of drilling fluid filtrate and fines invasion. The invasion or flushed zone radius depends on many factors including fluid loss and rheological properties of the drilling fluid, drilling rate, formation permeability and porosity, and the difference between hydrostatic drilling fluid pressure and formation pressure. Depending on those factors, flushed zone radii can vary from essentially nil to 10 feet in extreme cases. In wells drilled with synthetic oil base mud (SOBM), the flushed zone can be relatively shallow (e.g., 4 inches or less). The present disclosure provides a method and apparatus for performing measurements in the non-invaded or unaltered part of a formation.

SUMMARY

The present invention relates to making one or more measurements in a virgin formation using a downhole tool that includes a miniature logging tool. The downhole tool is disposed in a wellbore penetrating the formation, adjacent to the formation, and a sidetrack borehole is made into the formation. All or a portion of the miniature logging tool is deployed into the sidetrack borehole and measurements are made in the virgin formation using the miniature logging tool. The downhole tool may include a drilling/coring module, a pump module, and packers. The drilling/coring module is used to make the sidetrack borehole, and the packers and pump module can be used to create an underbalanced drilling condition in an isolated section of the wellbore.

BRIEF DESCRIPTION OF THE FIGURES

FIG. 3I is a schematic view of the logging tool of FIG. 1 showing an operational configuration of the logging tool.

FIG. 4 is a schematic view of an alternative embodiment of a logging tool constructed in accordance with the present disclosure.

It is to be understood that the drawings are to be used for the purpose of illustration only, and not as a definition of the metes and bounds of the invention, the scope of which is to be determined only by the scope of the appended claims.

DETAILED DESCRIPTION

Specific embodiments of the invention will now be described with reference to the figures. Like elements in the various figures will be referenced with like numbers for consistency. In the following description, numerous details are set forth to provide an understanding of the present invention. However, it will be understood by those skilled in the art that the present invention may be practiced without many of these details and that numerous variations or modifications from the described embodiments are possible.

A method and apparatus are disclosed for performing formation evaluation measurements in the virgin reservoir (i.e., in part of the reservoir not altered by drilling fluid or fines invasion or drilling damage). Moreover, the method and apparatus disclosed herein prevents mudcake formation and therefore eliminates the deleterious effects of mudcake on shallow reading pad devices. A formation evaluation logging tool is conveyed in a borehole on a wireline after drilling of the well, or alternatively conveyed in the borehole as part of the drill string. The logging tool is referred to herein as a "Pump/Packer/Drilling/Logging tool" which will become apparent from the following description.

Figure 1:
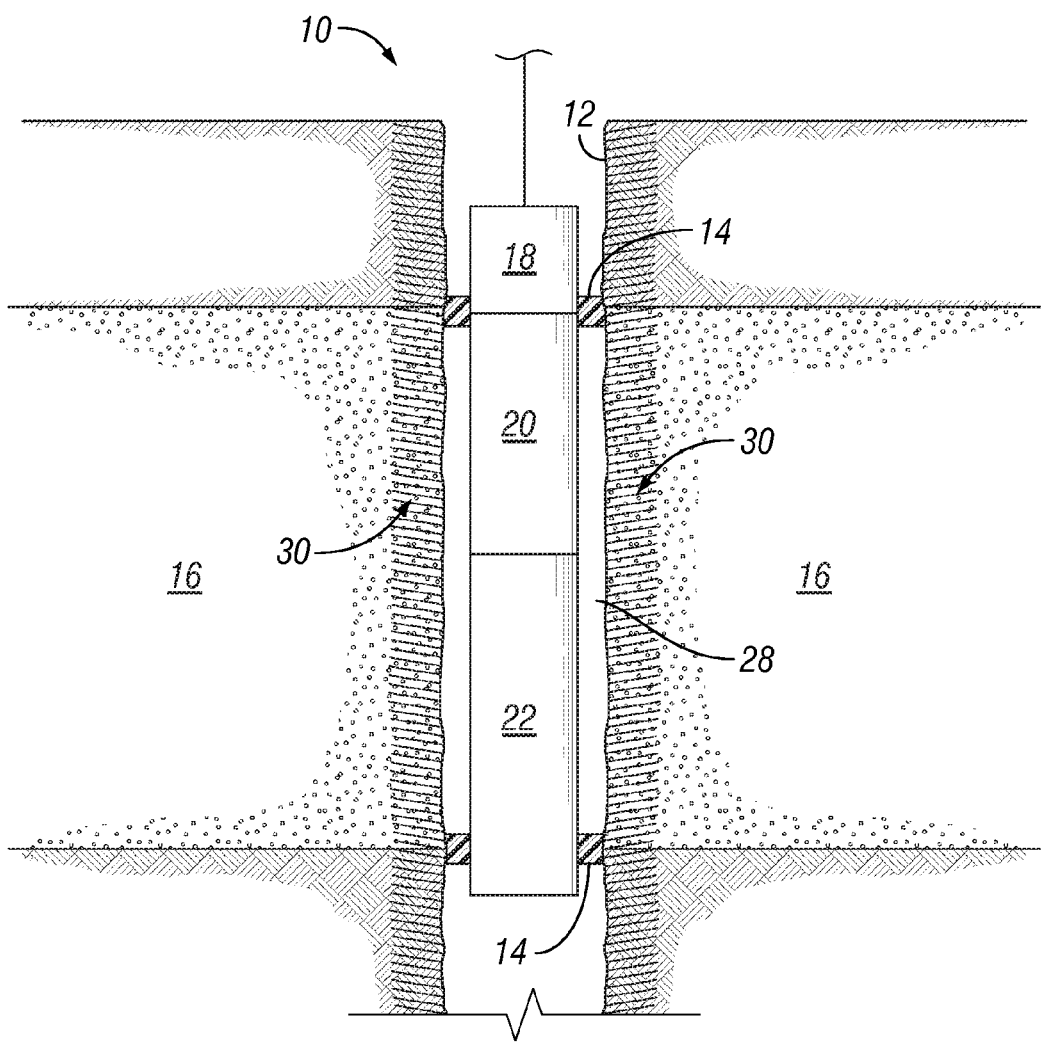
FIG. 1 is a schematic view of an embodiment of a logging tool used to make measurements in virgin formations, in accordance with the present disclosure.

FIG. 1 shows a schematic view of a Pump/Packer/Drilling/Logging tool 10 in a borehole 12 with inflatable packers 14 inflated over a zone of interest 16. Other packer types may be used. Tool 10 comprises various modules, such as a pumping module 18, a drilling and/or coring module 20, and a logging tool module 22, that contain different hardware elements. For example, logging tool module 22 may contains racks carrying miniature logging tools 24 to be deployed in a sidetrack borehole 26 (see, e.g., FIGS. 3D-3H).

Inflatable packers 14 are used to isolate a section of the zone of interest 16 in a conventionally drilled borehole. The hydrostatic pressure of the drilling mud in the sealed off or isolated section 28 of the borehole can be reduced by pumping borehole fluid from isolated section 28 into the borehole regions above or below isolated section 28. The purpose of the pumping is to reduce the hydrostatic pressure of the drilling mud in isolated section 28 below the formation pressure. A small diameter (e.g., 1.5 to 3 in.) sidetrack borehole 26 can then be drilled laterally into the reservoir from within isolated zone 28. The term "sidetrack borehole" is used to differentiate this small borehole from the original, conventionally drilled borehole. The sidetrack borehole (or drill hole) 26 is drilled underbalanced so reservoir fluids may be produced as the drill hole is drilled. The underbalanced drilling insures that the formation around drill hole 26 is not invaded. It also allows fluids flowing into sidetrack borehole 26 to lubricate the drill bit and help remove cuttings. The produced fluids, if any, can be captured and analyzed either downhole or uphole. The amount and type of fluid captured can be used to infer information on the relative permeability and production potential of the reservoir.

There are prior art methods and associated apparatus for underbalanced drilling of conventional boreholes. For example, U.S. Pat. Nos. 7,032,691 and 7,308,952 disclose such tools and methods. In conventional wellbore drilling, there are several advantages to drilling underbalanced. The main reason is to prevent lost circulation, a frequently encountered drilling problem that wastes valuable rig time. Lost circulation occurs when the formation is fractured and drilling mud flows from the borehole into the fractures. Underbalanced drilling also mitigates differential sticking of the drill string. Other advantages include higher drilling rates and early analysis of produced reservoir fluids and formation productivity potential. There are, however, some disadvantages to underbalanced drilling, including the higher risk for losing control of the well. Underbalanced drilling can also interfere with logging while drilling mud pulse telemetry if too much produced gas enters the wellbore.

The technology to drill shallow, small diameter lateral sidewall coring holes from a conventional borehole into a formation is known today. The Schlumberger Mechanical Sidewall-Coring Tool™ (MSCT tool) (see, e.g., U.S. Pat. No. 4,714,119) is a commercial tool that drills and recovers core samples having 0.91 in. diameters and 2.0 in. lengths. A new Schlumberger tool currently in field test (see U.S. 2009/0114447) drills larger diameter holes and recovers larger core samples (i.e., 1.5 in. diameters and 3 in. lengths).

Similar technology and synthetic diamond drill bits can be used to drill deep, small diameter sidetrack boreholes. There are, however, some important differences. With both of the aforementioned sidewall coring tools, the holes are drilled overbalanced. The shallow sidewall cores are cut from the invaded (or invasion) zone 30. The retrieved cores are further flushed by the drilling fluid during the coring process which limits, among other things, their usefulness for determining flushed zone reservoir saturations from analysis of the cores. Another difference between drilling sidewall cores and drilling sidetrack boreholes is the larger volume of cuttings (i.e., equal to the volume of the core) that must be removed when drilling sidetrack boreholes.

The sidetrack borehole depth preferably extends beyond the invaded zone 30, which could be a few inches or several feet. Today, many wells are drilled with SOBM, for which invaded zone radii are often very shallow, e.g., say 4 inches or less. In such cases, the sidetrack borehole 26 could be drilled to a length of about 10 in., which equals the length of the invaded zone (e.g., 4 in.) plus the sensor antenna or aperture length of miniature logging tool 24 (e.g., say about 6 in.). The recovery of a sidewall core would be optional. Moreover, an unflushed core could be cut while making sidetrack borehole 26 and then extracted, captured, analyzed, and sent to the surface for lab analysis.

The technology for building scaled down versions of borehole logging tools, e.g., micro-mechanical and electrical (MEM) devices, exist today. The design of scaled down logging tools is possible today partly because of the advances in MEM device technology and the evolution of precision machining techniques. As is known to those skilled in the art, the design of small size tools to log sidetrack boreholes closely parallels the designs used by conventional borehole logging tools, except for the smaller dimensions. Conventional borehole logging tools have diameters that typically range from about 1 $^{11}$/$_{16}$ inches for "thru-tubing" cased-hole logging tools to about 6 inches for larger, open-hole logging tools. The conventional open-hole logging tools are designed to operate in boreholes ranging in diameter from about 6.5 to 14 inches. Slimhole tools are used to log deep wells drilled with smaller diameter boreholes.

These miniature sensors/logging tools 24 can be conveyed (e.g., pushed) into sidetrack borehole 26 on a wireline or cable after the lateral drilling reaches the desired total depth into the formation. As with standard wireline logging operations, several different miniature sensors/logging tools 24 (e.g., density, neutron, and NMR) could be run together on a single trip into sidetrack borehole 26. Alternatively, the scaled down logging tools 24 could be conveyed on a sidetrack drill string (not shown) and measurements made while drilling sidetrack borehole 26 using a small diameter, measuring-while-drilling (MWD) tool. Making measurements at different distances in sidetrack borehole 26 would provide detailed information about the depth of invasion. This would provide more accurate information than can be inferred today from deep induction or laterolog tool measurements made at different DOI.

As stated above, sidetrack borehole 26 is preferably drilled to a radial distance that exceeds the flushed zone radius. Miniature logging tool 24 (see, e.g., FIGS. 3A-3I) is conveyed into drill hole 26 to make measurements in the non-invaded formation. Miniature logging tool 24 may comprise any small diameter sensor. For example, miniature logging tool 24 may make NMR, resistivity, nuclear, sonic, or dielectric measurements. One or more miniature logging tools 24 can be used to perform measurements of the non-invaded reservoir in the same drill hole 26. Although the DOI of those measurements may be very shallow (e.g., within about 1 inch of the sidetrack borehole wall), the zone of investigation would be in a non-invaded part of the reservoir because sidetrack borehole 26 is drilled underbalanced.

The sidetrack boreholes discussed in this disclosure have small diameters, typically a few inches or less. The small diameters allow high penetration rates to minimize drilling time. The logging sensors used to log the sidetrack boreholes would necessarily have diameters less than a few inches, and in a preferred embodiment, a length of 6 in. or less, depending on the particular sensor. In a preferred embodiment, the electronics section of miniature logging tool 24, which can be several times longer than the sensor section or aperture, is separated from the sensor section and retained in logging tool module 22 of Pump/Packer/Drilling/Logging tool 10. The sensor section and electronics of miniature logging tool 24 could be connected, for example, by shielded cables. For logging operations, the sensor section could be deployed into sidetrack borehole 26 while the longer electronics section remains in tool module 22. The received signals can be stored and/or processed either uphole or downhole using methods and hardware known in the industry. As stated above, one or more miniature logging tools 24 can be stored in a tool rack within logging tool module 22. FIGS. 3A-3I show the separate sensors and associated electronics in logging tool module 22.

Figure 2:
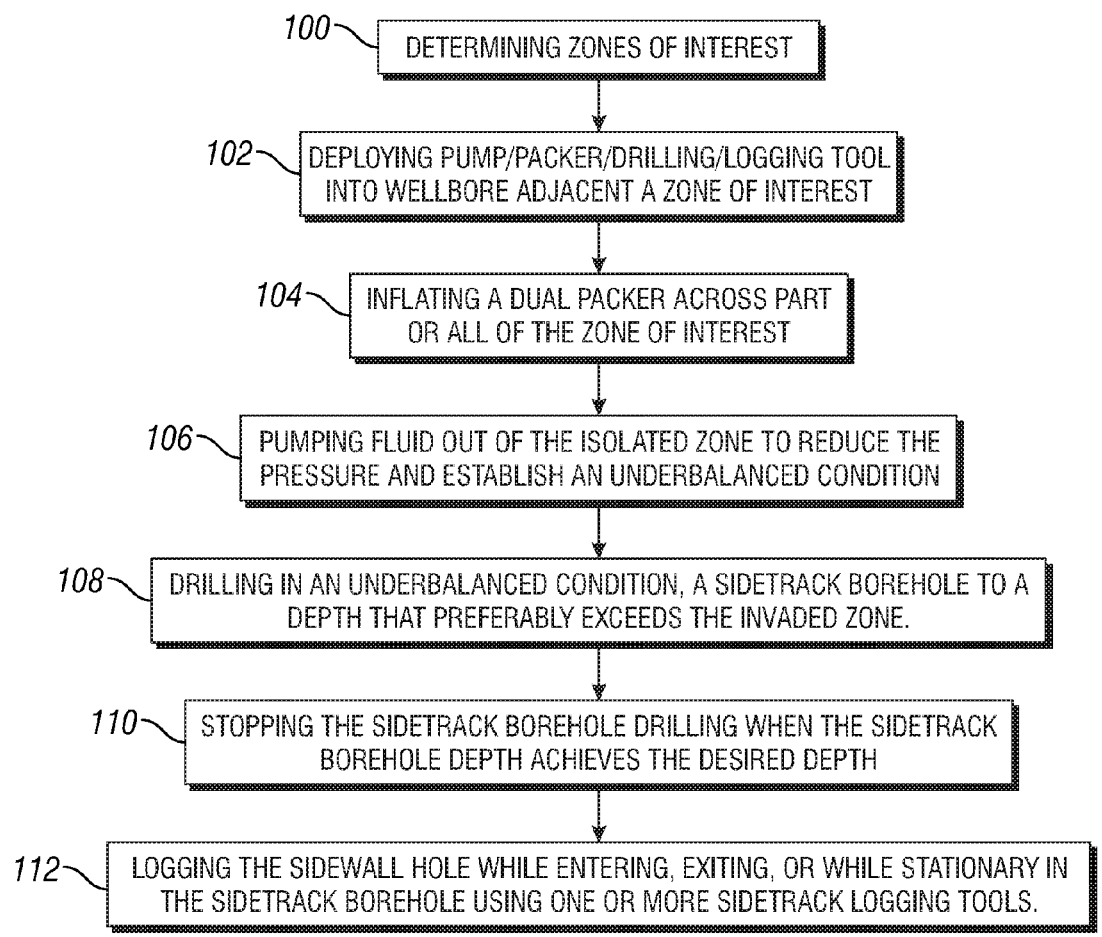
FIG. 2 is a flowchart showing the steps in an embodiment described in the present disclosure.

Exemplary operational steps disclosed herein are shown in FIG. 2 and include: (1) determining the zones of interest, for example, by logging the borehole using one or more conventional logging tools (step 100); (2) deploying a Pump/Packer/Drilling/Logging tool in a wellbore adjacent a zone of interest (step 102); (3) inflating a dual packer across part or all of the zone of interest (step 104); (4) pumping fluid out of the isolated zone to reduce the pressure and establish an underbalanced condition using the motor and pump in the pumping module of the Pump/Packer/Drilling/Logging tool (step 106); (5) drilling, in an underbalanced condition, a sidetrack borehole to a depth that preferably exceeds the invaded zone using a drilling and/or coring module (step 108); (6) stopping the sidetrack borehole drilling when the sidetrack borehole depth achieves the desired depth (step 110); and (7) logging the sidewall hole while entering, exiting, or while stationary in the sidetrack borehole using one or more sidetrack logging tools (step 112).

Figure 3B:
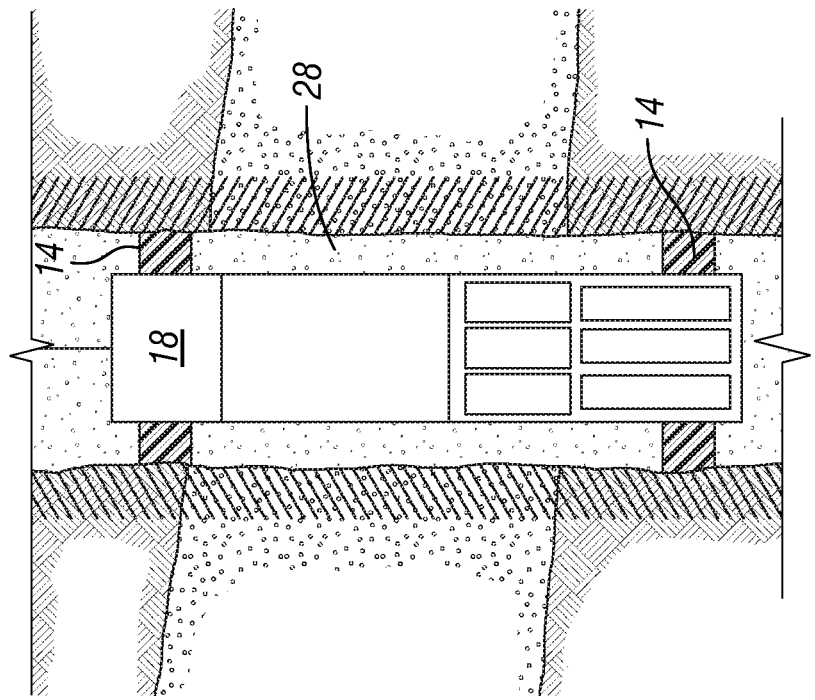
FIG. 3B is a schematic view of the logging tool of FIG. 1 showing an operational configuration of the logging tool.
Figure 3A:
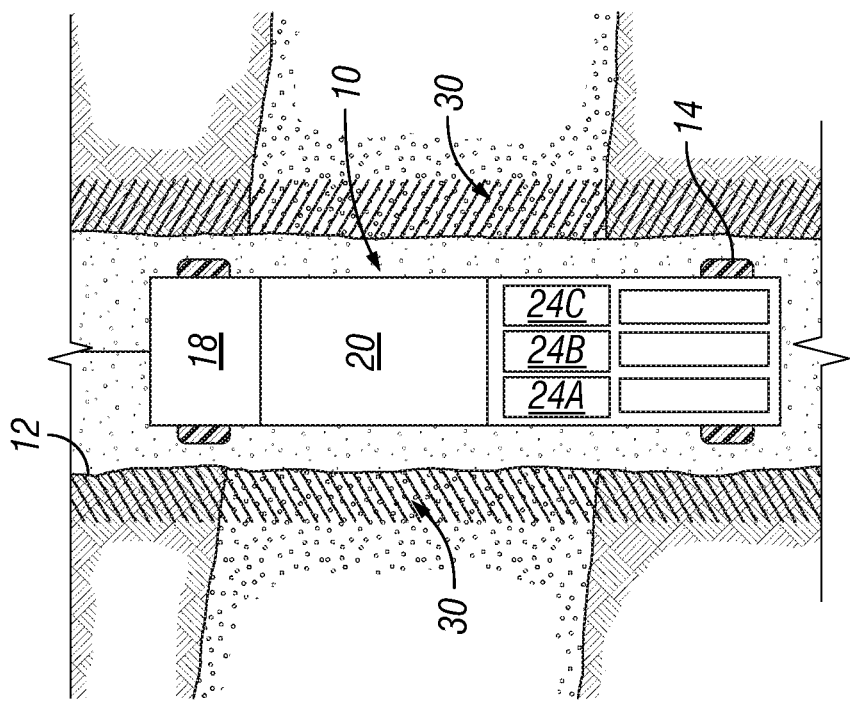
FIG. 3A is a schematic view of the logging tool of FIG. 1 showing an operational configuration of the logging tool.
Figure 3D:
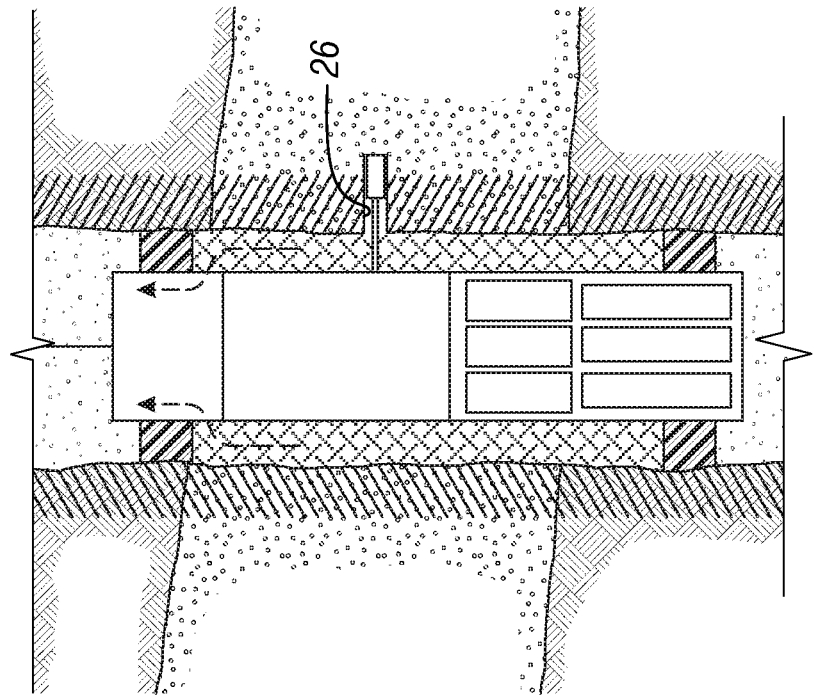
FIG. 3D is a schematic view of the logging tool of FIG. 1 showing an operational configuration of the logging tool.
Figure 3C:
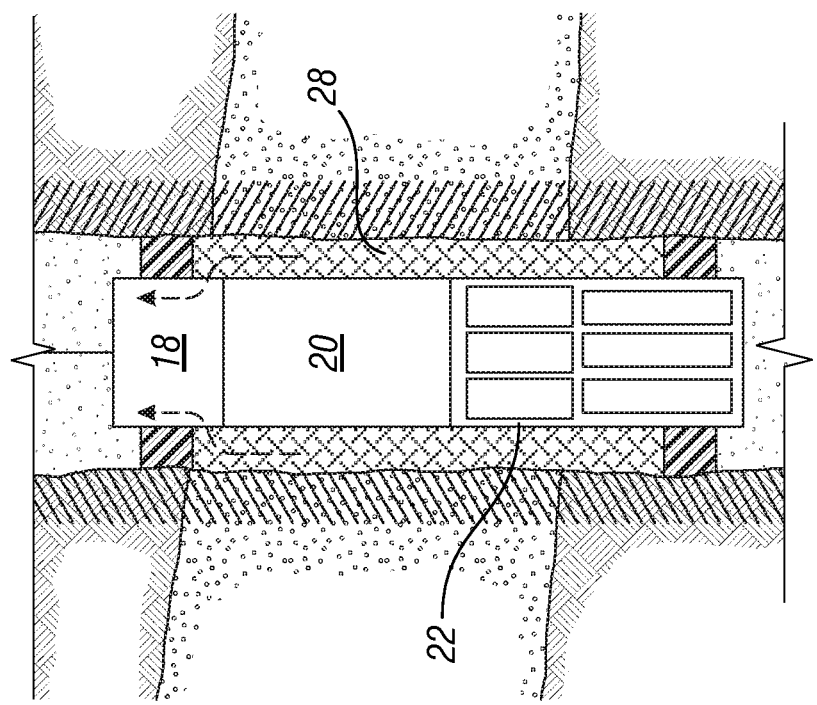
FIG. 3C is a schematic view of the logging tool of FIG. 1 showing an operational configuration of the logging tool.
Figure 3F:
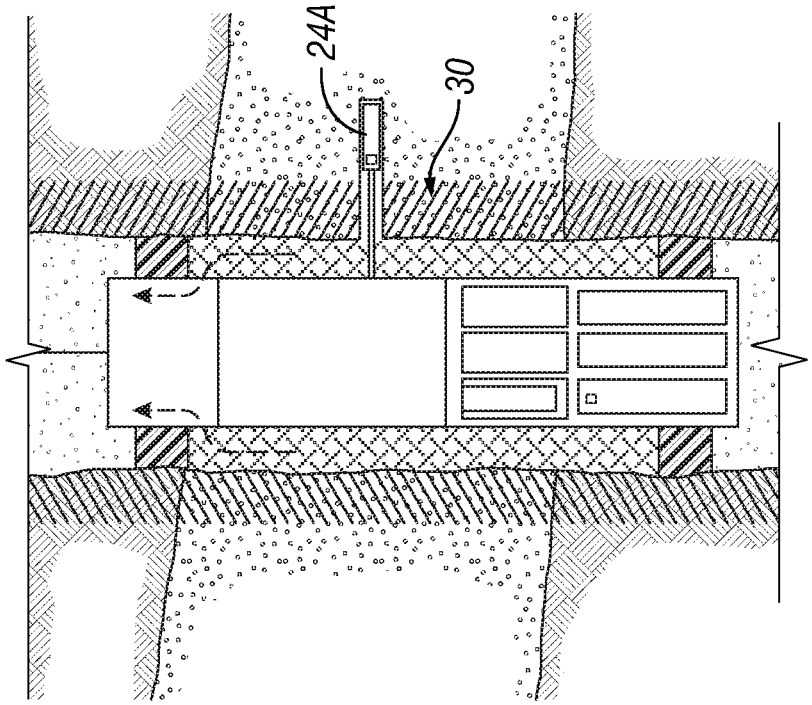
FIG. 3F is a schematic view of the logging tool of FIG. 1 showing an operational configuration of the logging tool.
Figure 3E:
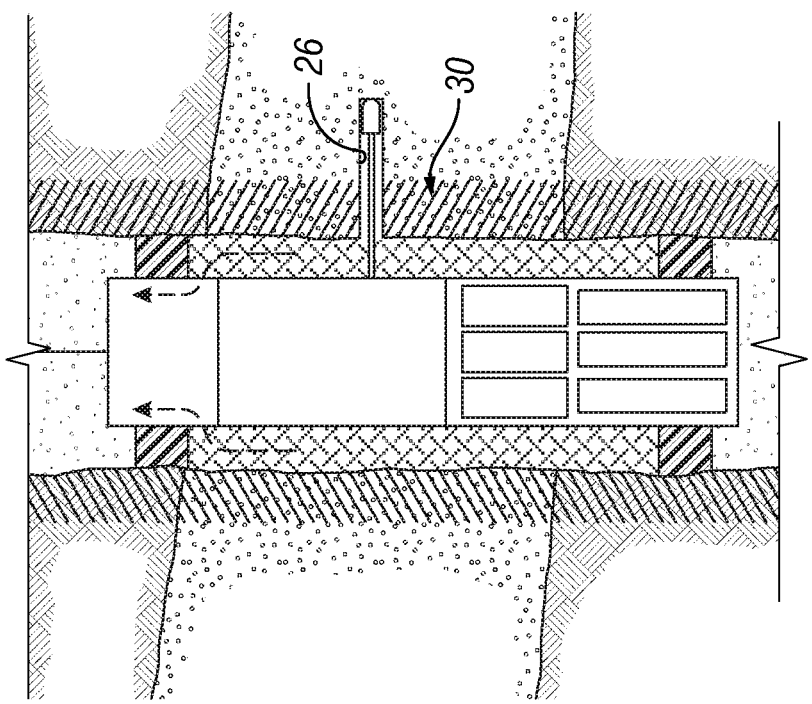
FIG. 3E is a schematic view of the logging tool of FIG. 1 showing an operational configuration of the logging tool.
Figure 3H:
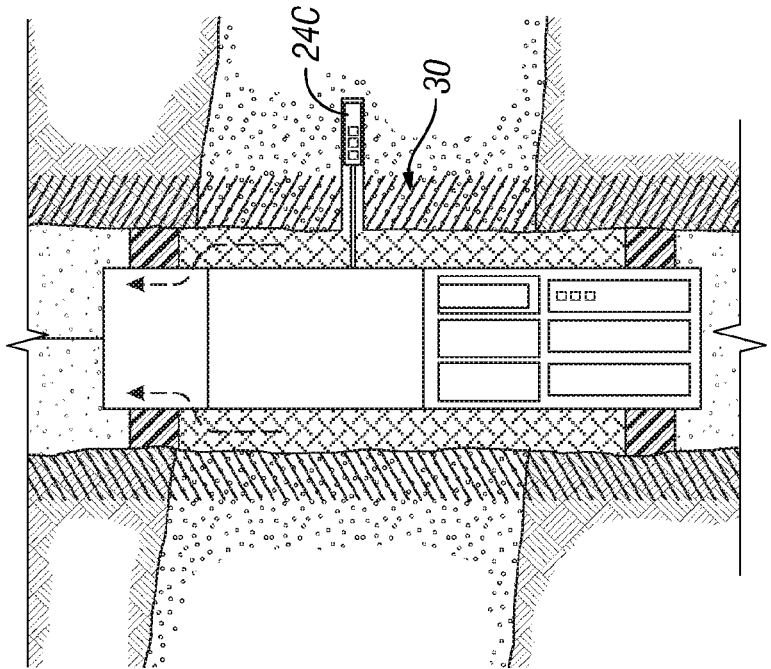
FIG. 3H is a schematic view of the logging tool of FIG. 1 showing an operational configuration of the logging tool.
Figure 3G:
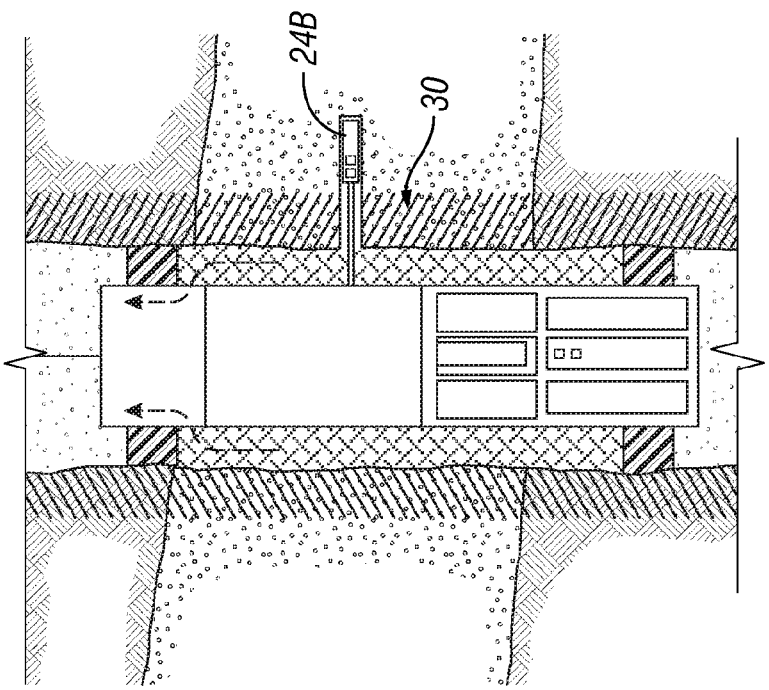
FIG. 3G is a schematic view of the logging tool of FIG. 1 showing an operational configuration of the logging tool.

FIGS. 3A-3I show some of those exemplary steps with the Pump/Packer/Drilling/Logging tool 10 in corresponding operational configurations. Specifically, FIG. 3A shows tool 10 deployed in wellbore 12 adjacent zone of interest 16. FIG. 3B shows tool 10 with packers 14 inflated, isolating all or part of zone of interest 16. FIG. 3C shows fluid being pumped from isolated section 28 to produce an underbalanced condition. FIG. 3D shows sidetrack borehole 26 being drilled while pumping maintains the underbalanced condition. FIG. 3E shows cessation of drilling of sidetrack borehole 26, as it has achieved the desired depth, in this case, beyond invasion zone 30. FIG. 3F shows a first miniature logging tool (or sensor portion) 24A deployed in sidetrack borehole 26; FIG. 3G shows a second miniature logging tool (or sensor portion) 24B deployed in sidetrack borehole 26; and FIG. 3H shows a third miniature logging tool (or sensor portion) 24C deployed in sidetrack borehole 26. FIG. 3I shows tool 10 with packers 14 deflated and ready for deployment to another zone of interest or withdrawal from borehole 12.

The formation evaluation benefits of underbalanced sidetrack borehole drilling and logging, and fluid sampling, may include, but are not limited to, the following. Also, some or all of these benefits may not be achieved in each and every use of the method and the benefits listed are not to be construed as limitations on the method. The fluid saturations, porosities, and permeabilities are measured in non-invaded and non-damaged zones. The measurements are more accurate than conventional borehole measurements because there is no flushing of hydrocarbons by filtrate invasion and the formation is not damaged by fines invasion. Uncontaminated reservoir fluid samples may be taken by a small fluid sampling tool without having to pump for long periods of time to reduce contamination levels. The fluid samples would have zero filtrate contamination, which is not achievable by sampling from a conventional borehole. Thus very accurate reservoir fluid and pressure/volume/temperature (PVT) lab analyses can be performed on the samples since oil base mud filtrate (OBMF) invasion would not be an issue.

In the case of an NMR sidetrack borehole logging tool, the NMR measurements would be equivalent to having a deep reading gradient-type NMR tool that could "see" beyond the invaded zone and have zero signal response from the invaded zone. For a density sidetrack borehole logging tool, the porosity would be more accurate because there would be no mudcake correction and no fines invasion. A microwave dielectric sidetrack borehole tool would similarly not be affected by mudcake or invasion and could directly measure the dielectric properties of the formation surrounding the sidetrack borehole. In addition to improved formation evaluation, simpler logging tools may be used because measurements only need to be performed at a single DOI since there is no flushed zone. The power requirements for the formation evaluation tools would be lower because there is no need for measurements to see beyond the invasion zone or mudcake. Most of the power consumption would typically occur while drilling the sidetrack boreholes.

The above discussion largely assumes the Pump/Packer/Drilling/Logging tool is conveyed into the borehole via wireline or coil tubing after the drill string is removed from the wellbore. However, as alluded to above, the Pump/Packer/Drilling/Logging tool 10 could be part of a conventional drill string. Operationally, the drilling operations would be stopped, the straddle (inflatable) packer would be inflated across the zone of interest by the motor and pump module, the borehole mud would be pumped out of the isolated region of the borehole to establish an underbalanced condition, the sidetrack borehole would be drilled laterally (and optionally cored), and the sidetrack borehole would be logged using the miniature logging tools. A non-contaminated fluid sample could also be acquired by a miniature fluid sampling tool disposed in the sidetrack borehole.

FIG. 4 shows an alternative embodiment of an exemplary downhole tool 10 in wellbore 12 having, for example, a miniature NMR logging tool 24 configured in a measuring position. Setting pistons 32 urge tool 10 towards the wellbore wall. A sliding block 34 disposed in tool 10 is connected to a block actuating piston 36. Sliding block 34 has two operational positions: a drilling position (not shown), and a measuring position (as shown). In the drilling position, a drill bit 38 registers with an opening 40 of tool 10 surrounded by a seal element 42. Seal element 42 (e.g., an elastomeric donut) is used to seal a portion of the wellbore wall when downhole tool 10 is urged toward the wellbore wall. A motor 44 (e.g., a hydraulic motor) engaging keys affixed to a drill shaft is used to rotate the drill shaft. The drill shaft is also deployed from the tool (for example, by using pressure from a hydraulic line) and is used to drill a perforation or sidetrack borehole 26 extending through the sealed portion of the wellbore wall and into the formation/zone of interest 16. A perforation depth of approximately 3 inches or more is achievable, and deeper perforations may be achieved using a telescoping system (not shown). Thus, the perforation 26 extends beyond the invaded/damaged zone 30 of the formation 16. During drilling, a flow line connected to a pump (not shown) is used to maintain the pressure in the sealed area below the formation pressure to insure that no invasion is created. Also, drill cuttings may be pumped out. The drill shaft can be retracted into the sliding block 34 once drilling is terminated.

In the measuring position, a movable insert 46 registers with the opening 40 of tool 10 surrounded by seal element 42. Movable insert 46 includes a permanent magnet 48 used to generate a static magnetic field (typically labeled as $B_0$) to polarize the spins of hydrogen atoms (or other atoms) in the formation fluid. Movable insert 46 also includes an NMR antenna 50 coupled to electronics 52. NMR antenna 50 can optionally include ferrite (not shown) to enhance signal to noise and shape the transverse field, $B_1$, produced by NMR antenna 50, as desired (this is true for all antenna modules contemplated herein). NMR antenna 50 is configured to induce precession of the nuclear spins of the hydrogen atoms (herein after "spins") and allow for monitoring the nuclear spin magnetization of the hydrogen atoms. The frequency of resonance, known as the Larmor frequency, is a function of the $B_0$ field strength in the formation. The associated electronics is capable of selectively driving the antenna as an emitter or as a receiver, at one or more frequencies.

Movable insert 46 is protected in the downhole tool housing during conveyance. Therefore, movable insert 46 may be made of electrically insulating material, such as PEEK (polyether-ether-ketone) or PEK (polyether-ketone). An advantage of the compact design shown is that the magnetic field $B_0$ generated in the formation by the magnet is larger than the magnetic field $B_0$ generated by most conventional downhole NMR tools (for example, wireline or Logging While Drilling tools). Thus, the excitation frequency of the transverse field $B_1$ may be higher (for example, 2 MHz), and/or the measurement would be sensitive to regions farther away from the wellbore wall because the static field $B_0$ is comparatively stronger. During the measurement phase, fluid can be extracted from the formation via a flow line. Fluid (e.g., formation gas, formation water, fluid useful in Enhanced Oil Recovery processes, etc.) can also be injected if the underbalanced condition is no longer needed or desired.

Figure 5:
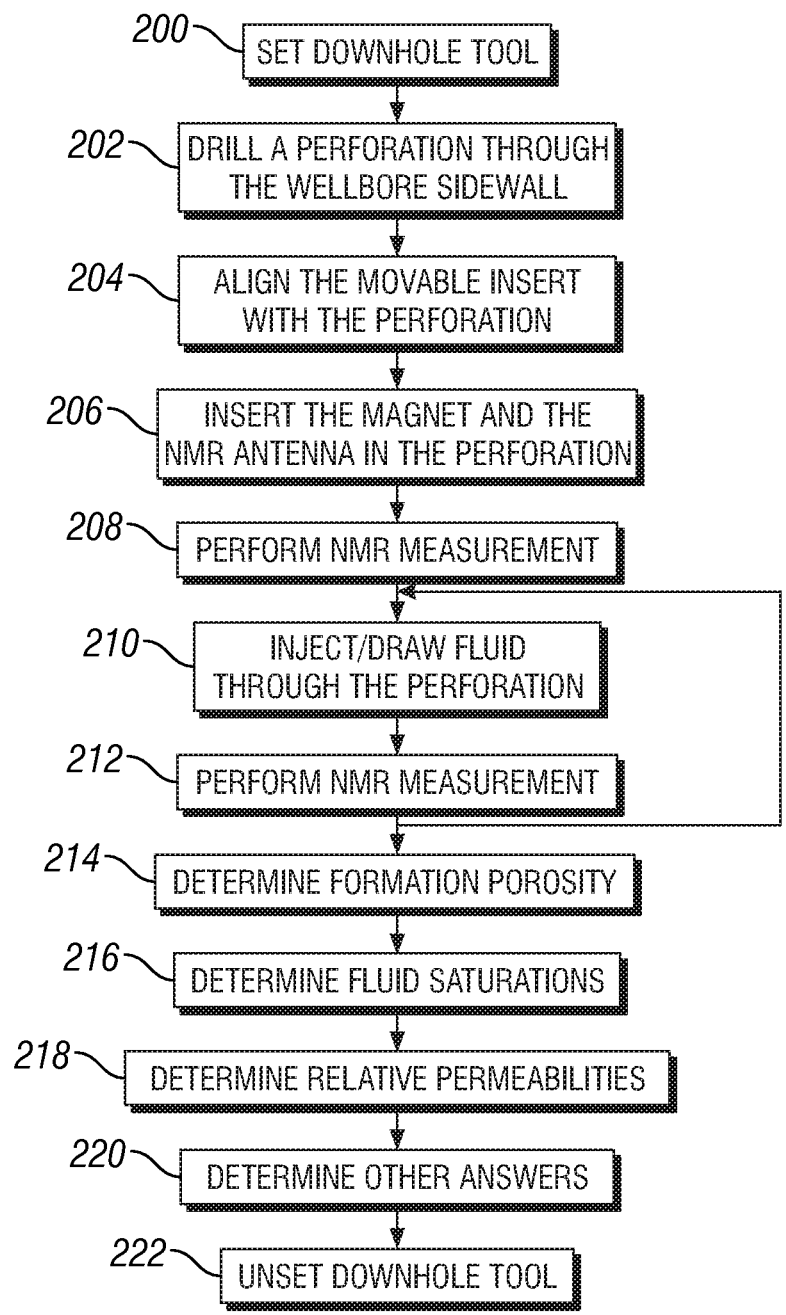
FIG. 5 is a flowchart showing the steps in an embodiment described in the present disclosure.

FIG. 5 is a flow chart showing a formation evaluation technique that can be performed with the tool of FIG. 4 or other tools. Operationally, the tool is set (or anchored) (step 200), and a perforation in the wellbore wall is made (step 202). The perforation is preferably deep enough to extend beyond the damaged zone and invaded zone (of the order of 3 inches, usually between 1 and 6 inches). The perforation is made in a way that prevents invasion by the drilling fluid into the perforation. Typically, the perforation is made in an underbalanced condition. In cases where the formation has a low permeability, drilling in an underbalanced condition is not essential, provided the measurement (e.g., NMR measurement) is performed relatively soon after drilling, as the invasion in such formations is slow and likely to be shallow (say, 0.5 inch), especially shortly after drilling.

The moveable insert is aligned with the perforation (step 204). Aligning the insert with a perforation can be a difficult operation downhole, however the tool of FIG. 4 solves that problem by using a sliding block disposed in the tool body and proper anchoring of the tool in the wellbore. Other techniques may used, such as incorporating the magnet and antenna into the drill shaft.

As alluded to above, once the movable insert, having in this example the NMR magnet and the antenna, is inserted into the sidetrack borehole (step 206), the polarizing field $B_0$ is able to penetrate deeper in the formation, preferably deeper than the damaged/invaded zone. Thus, NMR signals from connate formation fluid located deep in the formation are stronger and may be detected by the antenna. Also, the precession frequency of the spins in the static field is higher, improving the quality of the measured signals. Other advantages include shorter times between excitation pulses, greater signal to noise ratios, and smaller electronics components, though those are not to be construed as limitations on the tool or method.

Continuing the operational steps for this example, an NMR measurement is performed (step 208). A T1 relaxation time distribution can be measured during the polarization of the spins by the field $B_0$. A T2 relaxation time distribution can also be measured after the antenna is used to induce spin precession around the polarization direction. Also, diffusion editing pulses, such as those described in SPE paper 84478, can be used.

Optionally, fluids may be drawn or injected into the formation near the NMR sensor (step 210). Various fluids may be injected. In a gas drive reservoir, natural gas may be injected to evaluate the oil residual saturation, and consequently, the amount of oil recoverable from the formation. The same may be done in a water drive reservoir by injecting water. Fluid used to enhance oil recovery (e.g., surfactants, flushing fluids) may also be injected to estimate their efficiency. Further NMR measurements may be performed (step 212) and the fluid draw-down or injection and further NMR measurement may be repeated any desired number of times.

Various formation parameters may be estimated from one or more of the measured T1 distributions and/or T2 distributions, optionally corresponding to different diffusion times. Such formation parameters may include, but are not limited to, porosity (step 214); oil, water, and gas saturations (step 216); permeability estimates (step 218); oil viscosity measurements (step 220); and hydrogen indices (step 220). When fluids are introduced into the formation, relative permeability curves may also be derived using, for example, techniques described in U.S. Pat. No. 6,528,995 or U.S. Pat. No. 6,856,132. When operations at a particular location in the wellbore are finished, the tool is unset (step 222) and the method may be performed at another location in the well.

Figure 6:
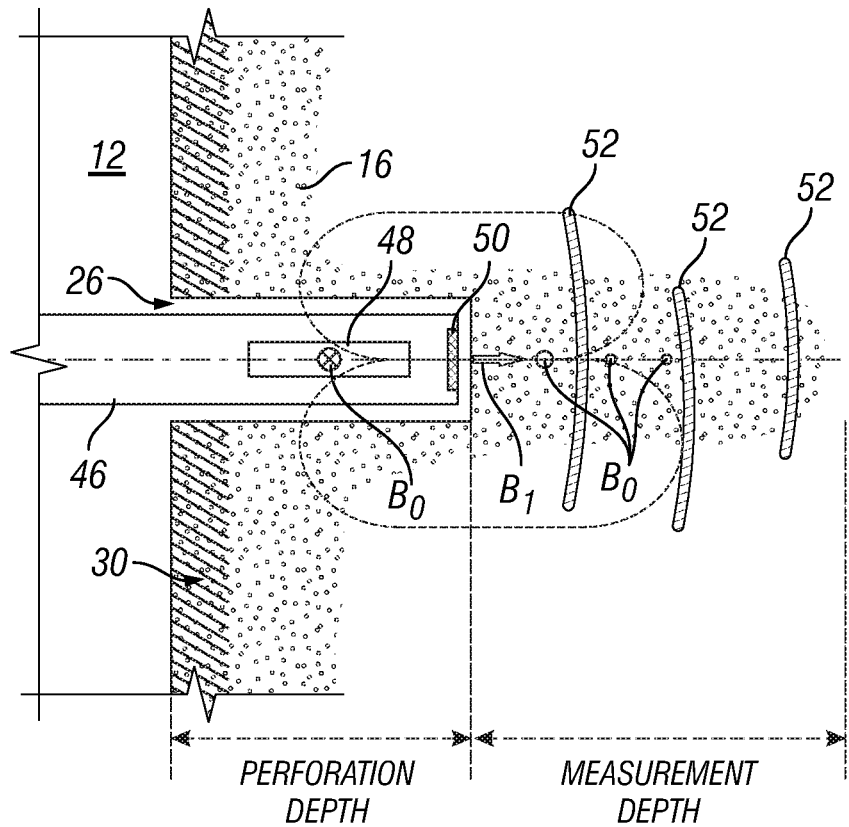
FIG. 6 is a schematic view of an alternative embodiment of a miniature logging tool constructed in accordance with the present disclosure.

In the configuration of FIG. 6, the magnet 48 is configured to generate a static field $B_0$ in the formation that is orthogonal to the perforation axis. Also, the static field exhibits a gradient—its magnitude decreases with increasing distance from the distal end of the perforation and along the perforation axis. The antenna 50 may include a coil, configured to generate or sense a $B_1$ field aligned with the perforation axis. The antenna 50 may be driven sequentially at several frequencies to induce precession of the hydrogen spins in respective measurement shells 52 (the lower the frequency, the deeper the shell). Therefore, properties of the fluid in different regions of the formation 16 may be measured by adjusting the driving frequency of the antenna 50 (discrete values in the range from 500 kHz to 2 MHz, for example).

Figure 7:
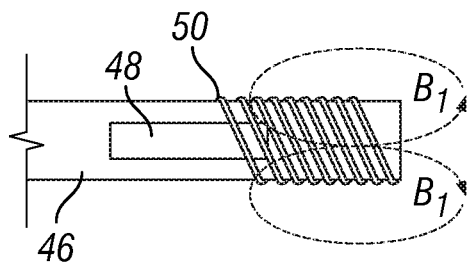
FIG. 7 is a schematic view of an alternative embodiment of an antenna portion of a miniature logging tool constructed in accordance with the present disclosure.

The configuration of FIG. 6 may be modified to have a complete antenna loop all the way around the moveable insert 46, giving a field $B_1$ in a perpendicular fashion along the insert axis and having field lines that are symmetric all the way around the insert axis. A portion of this configuration is shown in FIG. 7.

Figure 8:
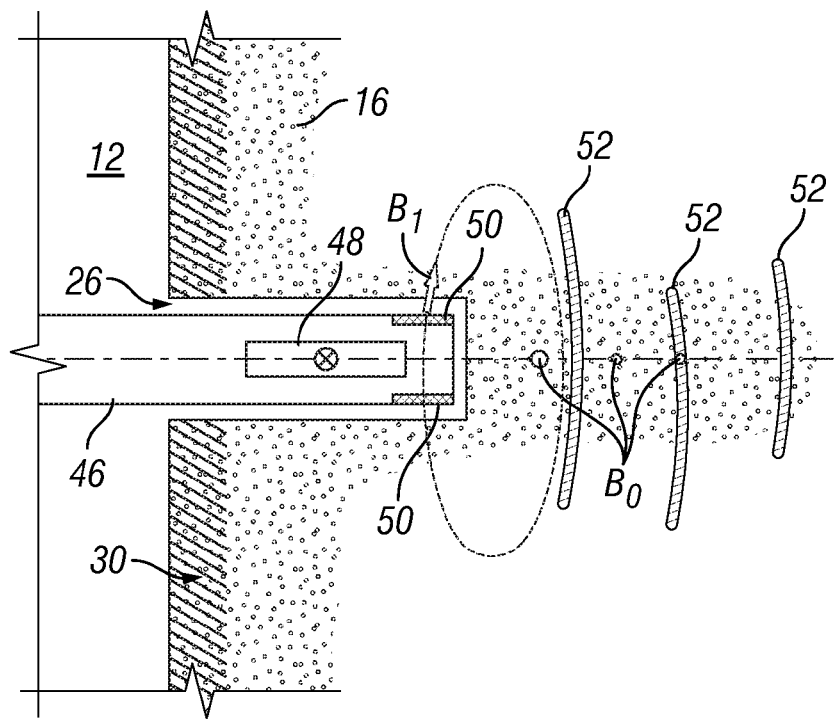
FIG. 8 is a schematic view of an alternative embodiment of a miniature logging tool constructed in accordance with the present disclosure.

The configuration of FIG. 8 is similar to what is shown in FIG. 6. In this case, the antenna 50 comprises two coils wired in series. Thus, the shape of the measurement shells 52 may be different from the configuration of FIG. 6. In particular, the shape of the measurement shells 52 is not expected to be symmetrical with respect to the perforation axis. Thus, the moveable insert 46 may be rotated to rotate the axis of the coils, and different regions of the formation may be directionally investigated. The coils rotate with the permanent magnet (and the field $B_0$) to keep the perpendicular relationship between the fields $B_0$ and $B_1$. This imaging capability may be useful when injecting in non-isotropic formations (for example, when horizontal and vertical permeabilities are different). The configurations of FIG. 6 and FIG. 8 may be combined in a single measuring device.

Figure 9:
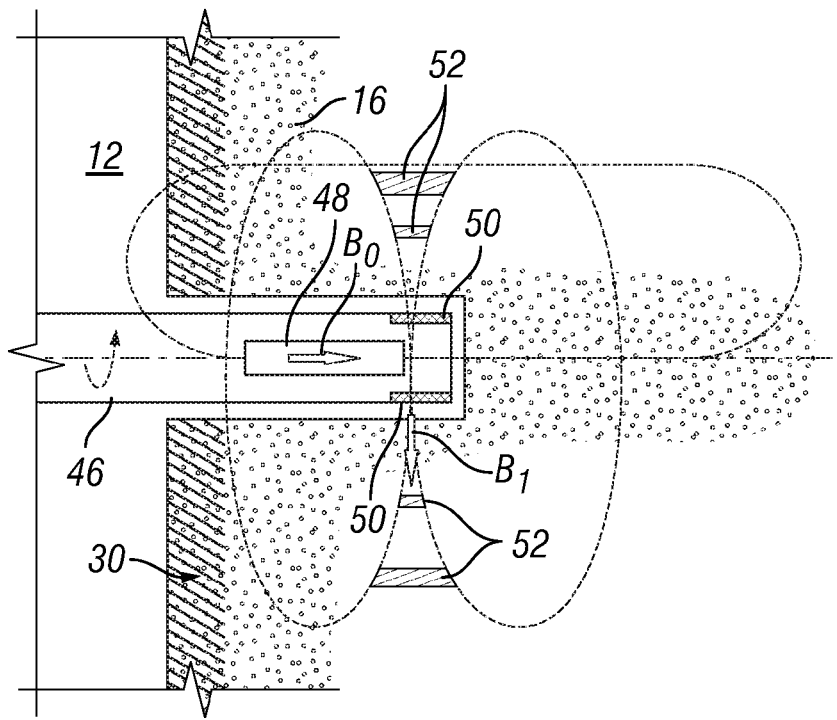
FIG. 9 is a schematic view of an alternative embodiment of a miniature logging tool constructed in accordance with the present disclosure.

The configuration of FIG. 9 has an antenna similar to the configuration of FIG. 8. However, the magnet is disposed so that the static field is aligned with the perforation axis. This configuration may be useful to create a static field gradient in the plane perpendicular to the perforation axis. In this case, the measurement volume location (sensed volume) 52 varies radially when the driving frequency of the antenna changes (instead of axially as shown in FIG. 6 and FIG. 8). Again, the moveable insert 46 may be rotated to provide azimuthal imaging around the perforation axis. Alternatively, a single surface antenna coil may be used, or any number of coils may be spaced around the wall of the moveable insert 46 depending on the desired application. Multiple coils may be used to increase the signal to noise ratio.

Figure 10:
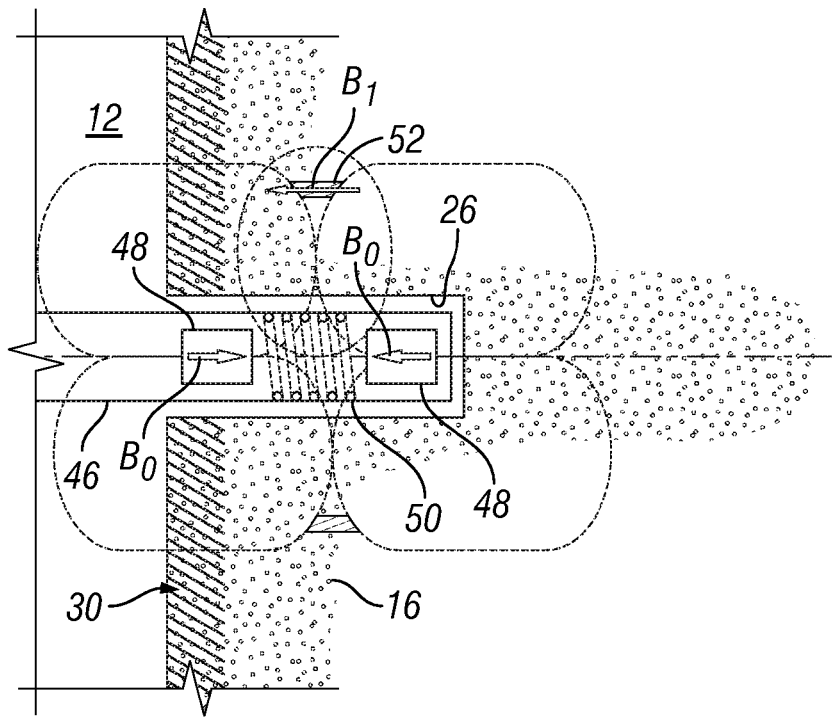
FIG. 10 is a schematic view of an alternative embodiment of a miniature logging tool constructed in accordance with the present disclosure.

In the configuration of FIG. 10, opposing magnets according to a "Jackson" design are used. The antenna comprises at least a complete cylindrical loop to generate the $B_1$ field as shown. This configuration provides azimuthally symmetric fields $B_0$ and $B_1$, as well as a controlled gradient of the field $B_0$, as is well known. In this configuration, the movable insert 46 may be translated within the perforation to sense different volumes 52 of the formation 16.

Figure 11:
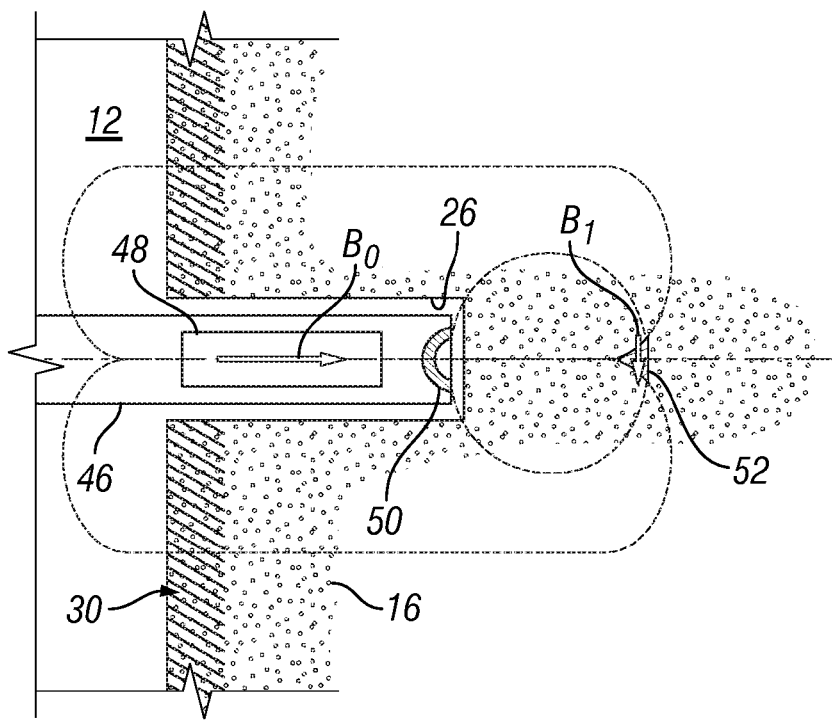
FIG. 11 is a schematic view of an alternative embodiment of a miniature logging tool constructed in accordance with the present disclosure.

In the configuration of FIG. 11, the magnet is configured to generate a static field aligned with the perforation axis. The antenna is configured to sense a more focused measurement volume 52 (compare with FIG. 9 or FIG. 10), based on the ½-coaxial design of the antenna 50 generating the $B_1$ field. In this configuration, the movable insert 46 may be translated within the perforation 26 to sense different volumes 52 of the formation 16.

Figure 12:
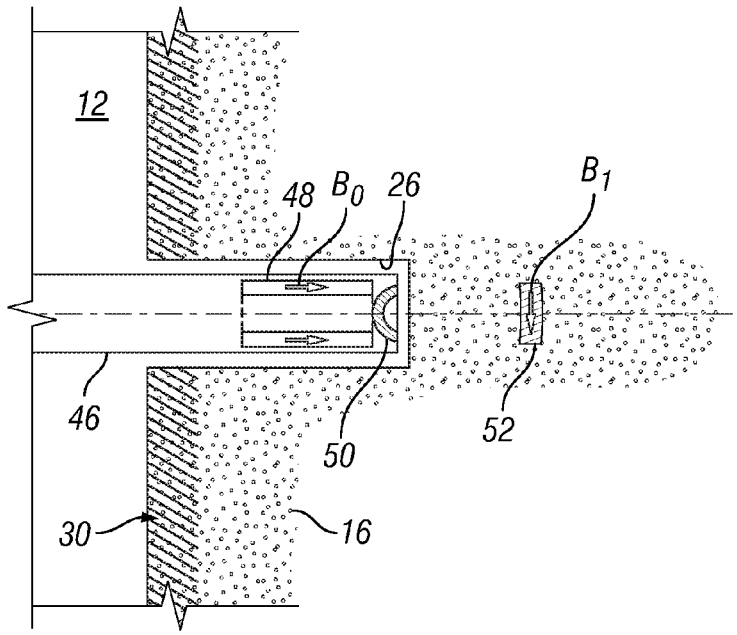
FIG. 12 is a schematic view of an alternative embodiment of a miniature logging tool constructed in accordance with the present disclosure.

In the configuration of FIG. 12, the magnet 48 is configured to generate a static field aligned with the perforation axis. The magnet 48 may comprise a hollow cylinder, or a combination of two or more magnet pieces with parallel magnetization. The configurations of FIG. 11 and FIG. 12 differ by their magnet arrangements, so that the sensed volume geometry 52 may be adjusted.

Figure 13:
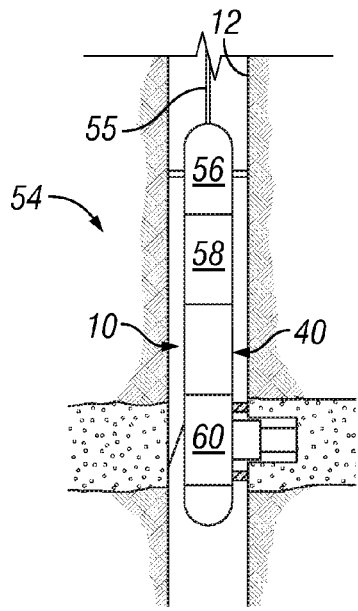
FIG. 13 is a schematic view of an alternative embodiment of a logging tool constructed in accordance with the present disclosure.
Figure 14:
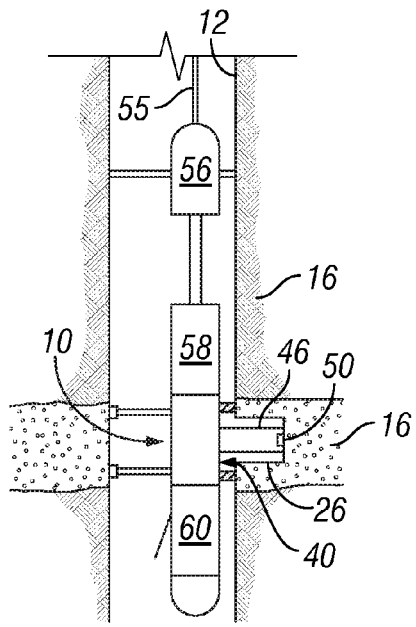
FIG. 14 is a schematic view of a different operational configuration of the logging tool of FIG. 13.

FIG. 13 and FIG. 14 illustrate another way of making a perforation 26 in a sidewall of the formation 16 and properly align an NMR tool movable insert 46, for example, with the perforation 26. The tool string 54 in those two figures is deployed on a wireline 55 and uses an anchoring tool 56 and an extension tool 58, similar to those disclosed in U.S. Patent Publication 2009/0025941. In this case, the perforation 26 is made by a coring tool 60 (for example, as shown in U.S. Patent Publication 2008/0078582 or U.S. Pat. No. 7,191,831).

In FIG. 14, a core has been removed from a sidewall of the formation 16, creating a perforation 26. The extension tool 58 is used to maintain alignment of the NMR tool opening 40 with the perforation 26, and to accurately position the NMR movable insert 46 with the perforation 26. The NMR movable insert 46 and sensors 50 can be as those previously described.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A method to make one or more measurements in a virgin formation, comprising:
   providing a downhole tool including a miniature logging tool;
   disposing the downhole tool in a wellbore penetrating the formation, adjacent to the formation;
   making a sidetrack borehole into the formation;
   deploying the miniature logging tool into the sidetrack borehole;
   isolating a section of the wellbore in which the downhole tool is disposed by setting one or more packers;
   pumping fluids from the isolated section to create an underbalanced condition in the wellbore, and
   making measurements in the virgin formation with the miniature logging tool.

2. The method of claim 1, wherein the miniature logging tool comprises at least one of an NMR, borehole imaging, resistivity, microwave dielectric, acoustic, nuclear, pressure, and fluid sampling tools.

3. The method of claim 1, wherein making the sidetrack borehole comprises drilling, coring, or perforating.

4. The method of claim 1, wherein deploying the logging tool into the sidetrack borehole comprises pushing or pulling the logging tool, or incorporating the logging tool into a sidetrack borehole drilling device.

5. The method of claim 4, wherein deploying the logging tool further comprises placing the logging tool beyond an invaded or damaged zone.

6. The method of claim 1, wherein deploying the logging tool comprises placing a sensor into the sidetrack borehole.

7. The method of claim 1, wherein deploying the logging tool comprises sequentially selecting one of several types of miniature logging tools and placing each, in turn, into the sidetrack borehole.

8. A downhole tool to make one or more measurements in a virgin formation, comprising:
   a tool body;
   a logging tool module, having one or more miniature logging tools, carried within the tool body, wherein at least one of the one or more miniature logging tools has a sensor portion separately deployable from an electronics portion; and
   a sidetrack borehole drilling and/or coring module carried within the tool body.

9. The downhole tool of claim 8, further comprising one or more packers.

10. The downhole tool of claim 8, further comprising a pump module.

11. A downhole tool to make one or more measurements in a virgin formation, comprising:
   a tool body;
   a sliding block carried within the tool body;
   a drilling/coring device carried by the sliding block; and
   a miniature logging tool, including a movable insert, carried by the sliding block.

12. The downhole tool of claim 11, further comprising a seal element carried on the tool body and circumferentially extending around an opening in the tool body.

13. The downhole tool of claim 11, further comprising a block actuator carried within the tool body.

14. The downhole tool of claim 11, further comprising setting pistons mounted on the tool body.

15. The downhole tool of claim 11, wherein the miniature logging tool is an NMR tool.

16. The downhole tool of claim 15, wherein the NMR tool has a magnet configuration that generates a static field in the formation that is orthogonal to a sidetrack borehole axis.

17. The downhole tool of claim 16, wherein the NMR tool has an antenna loop circumferentially extending around the moveable insert.

18. The downhole tool of claim 15, wherein the NMR tool has an antenna comprising two coils wired in series.

19. The downhole tool of claim 15, wherein the NMR tool has a magnet configuration that generates a static field in the formation that is parallel to a sidetrack borehole axis.

20. The downhole tool of claim 15, wherein the NMR tool has a "Jackson design" magnet configuration that generates a static field in the formation that is azimuthally symmetric.

21. The downhole tool of claim 15, wherein the NMR tool has a magnet configuration that generates a static field in the formation that is parallel to a sidetrack borehole axis and an antenna comprising a one-half coaxial design.

22. A method to make one or more measurements in a virgin formation, comprising:
   providing a downhole tool including: a tool body, a sliding block carried within the tool body, a drilling/coring device carried by the sliding block, and a miniature logging tool, including a movable insert, carried by the sliding block;
   setting the downhole tool in a wellbore penetrating the formation, adjacent to the formation;
   making a sidetrack borehole into the formation using the drilling/coring device;
   aligning the moveable insert with the sidetrack borehole by moving the sliding block;
   deploying the moveable insert into the sidetrack borehole;
   making measurements in the virgin formation using the miniature logging tool; and
   releasing the downhole tool.

23. The method of claim 22, further comprising determining formation properties.

24. The method of claim 22, further comprising preventing fluid communication between the wellbore and the sidetrack borehole; and injecting or withdrawing fluid from the sidetrack borehole.

* * * * *